United States Patent [19]

Rosenvold

[11] 4,234,224
[45] Nov. 18, 1980

[54] TRUCK BOX COVER DEVICE

[76] Inventor: Leo Rosenvold, Wildrose, N. Dak.

[21] Appl. No.: 959,566

[22] Filed: Nov. 13, 1978

[51] Int. Cl.³ .............................................. B60J 7/08
[52] U.S. Cl. ...................................................... 296/98
[58] Field of Search ................ 296/98, 141, 140, 100, 296/101

[56] References Cited

U.S. PATENT DOCUMENTS

| | | | |
|---|---|---|---|
| 3,366,414 | 1/1968 | Thompson et al. | 296/100 |
| 3,759,568 | 9/1973 | Unruh | 296/98 |
| 3,829,154 | 8/1974 | Bechnell | 296/98 |
| 4,050,734 | 9/1977 | Richard | 296/98 |

Primary Examiner—John J. Love
Assistant Examiner—Norman L. Stack
Attorney, Agent, or Firm—Robert E. Kleve

[57] ABSTRACT

The invention comprises a truck box cover device. The device has a rod with a rectangular tarp attached to the rod at its one end and attached to the edge of a truck box at its other end. The tarp is rolled onto the rod toward the edge of the truck box where the outer end of the tarp is attached to uncover the open top of a truck box, and is unrolled in the opposite direction to cover the truck box. A pair of ropes are attached to the outer ends of the rod at one end of the ropes. The outer ends of the ropes are attached to springs and the springs are attached to the sides of the truck box. As the tarp is unrolled the ropes are wound onto the rod. The springs act to place tension on the rope and clearly place tension on the rods and thereby urge the tarp in a straight line toward an unrolled position and thereby act to keep the tarp straight.

1 Claim, 9 Drawing Figures

TRUCK BOX COVER DEVICE

This invention relates to truck box cover devices and the like.

It is an object of the invention to provide a novel truck box cover which can be easily and rapidly operated to cover a truck box.

It is another object of the invention to provide a novel truck box cover device which can be easily operated to close a truck box and which can be manufactured with a minimum of expense.

Further objects and advantages of the invention will become apparent as the description proceeds and when taken in conjunction with the accompanying drawing wherein.

Briefly stated the invention comprises a truck box having a roll of tarp having a center rod adapted to roll along the top of the truck box unrolling or rolling the tarp onto the box, the outer end of the tarp is adapted to be attached to the edge of the truck box, a pair of ropes are attached at their one ends to center rod and to springs at the other ends, with the springs attached to the truck box, whereby the tarp may be unrolled toward the other edge of the truck box with the ropes winding onto the center rod and the springs acting to place tension on the ropes, and a rod to draw the tarp straight while being unrolled.

Figure 1:
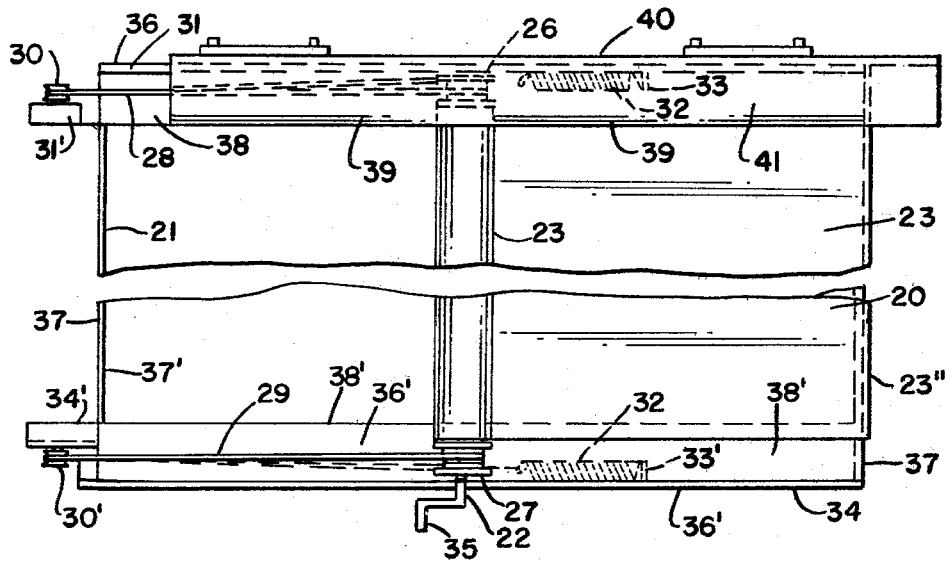
FIG. 1 is a top plan view of the removable truck box cover.

Referring more particularly to the drawing in FIG. 1, the truck box cover 20 is illustrated as being mounted to the truck box 21. The truck box cover 20 has a roller or center rod or pole or shaft 22 with a rectangular length of tarp 23 rolled onto the tarp with the inner end 23' attached to the rod 22. The rod 22 has a hollow interior with a slot along its length and the inner end 23' of the tarp is reversely folded and sewn along a line 22' and a tube 22" is inserted into the loop formed by the reverse folding and the tarp and tube 22" is inserted into the rod 22 with the tarp slid along the slot 50 to thereby attach the one end 23' of the tarp to the rod 22. The other end 23" of the tarp is attached to the rear end 36 of the box.

The rod 22 has a pair of spools 26 and 27 attached and fixed to its outer opposite ends of the rod 22. A pair of ropes 28 and 29 have their one end attached to the spools. The rope 28 has its one end attached to the spool 26 and extends around pulley 30, which pulley is totatably mounted to a bracket 31' on the side 37 of the truck box and the rope at its other end is attached to spring 32. Spring 32 has its other end attached to a pin 33 fixed to the front end wall 31 of the truck box. Similarly, rope 29 has its one end attached to spool 27 and extends around pulley 30', which pulley is rotatably mounted to a bracket on the side 37 of the truck box and the other end of rope 29 is attached to spring 32'. The spring 32' has its other end attached to pin 33' which pin is fixed to rear end wall 34 of the truck box. The ropes 28 and 29 pass through bores 51 in the front wall 37' to reach the springs in the interior of the box.

A handle 35 is fixed to one end of the rod 22. The springs 32 and 32' act to place tension on the ropes 28 and 29 and thereby place the rod 22 under tension.

Figure 2:
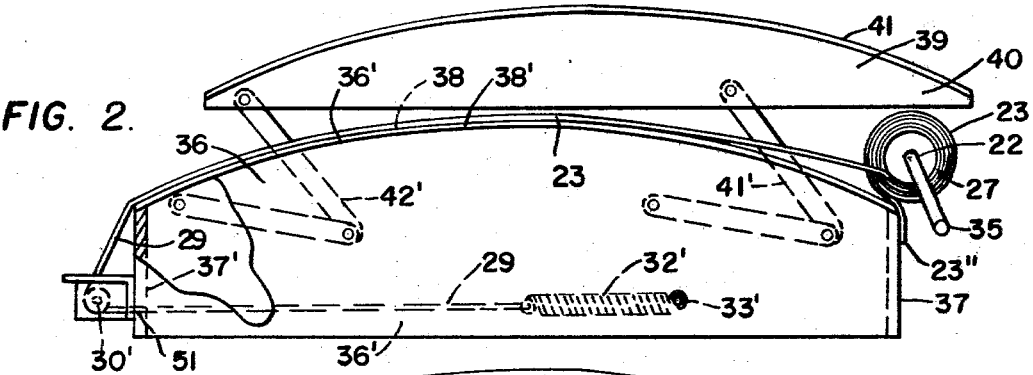
FIG. 2 is a side elevational view with the truck cover open.
Figure 3:
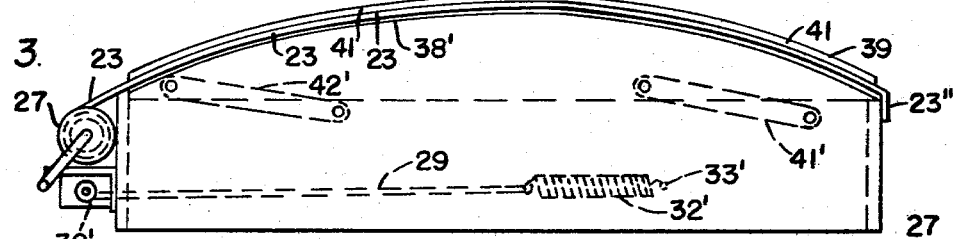
FIG. 3 is a side elevational view of the truck box cover with the truck box cover covered.
Figure 4:
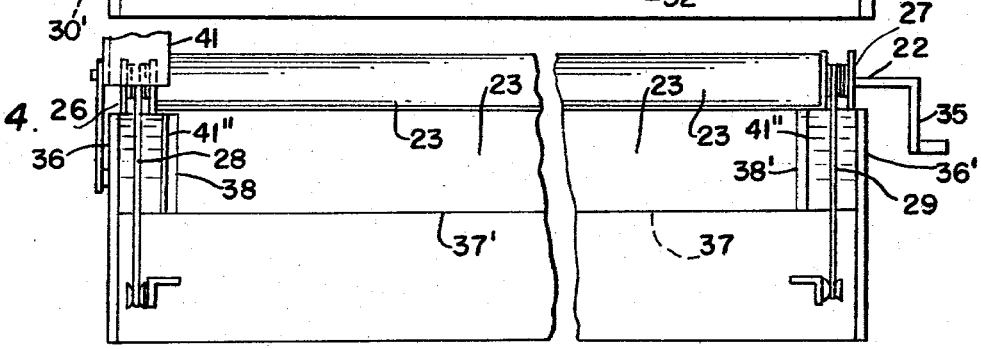
FIG. 4 is a front elevational view of the truck box cover.

The tarp cover is operated by rotating the crank 35 counterclockwise when viewed from FIG. 2 from its position shown in FIG. 2 to its position shown in FIG. 3. The rotation of the crank or handle rotates the rod 22 causing the rod 22 and the portion of the tarp wound on the rod to roll from right to left along the top edges 36 and 36' of the truck box on metal flanges 38 and 38' on edges 36 and 36' from edge 37 toward edge 37' of the truck box thereby unrolling the tarp.

The front and rear edges 36 and 36' are curved as illustrated and have metal flanges 38 and 38' fixed across the top surfaces. The side edges 37 and 37' are straight. The front and rear edges may be made straight. The side edges 37 and 37' will normally be longer than the end walls 31 and 34.

The springs 32 and 32', when attached as shown in the drawing, are expanded from their normal position and thereby place the rod 22 under tension urging the rod 22 from right to left, when viewed from FIGS. 2 or 3. As the tarp is being unrolled from left to right the ropes 28 and 29 are being wound onto the spools 26 and 27. Since the ropes are wound onto the spools in a counterclockwise direction when viewed from FIGS. 2 or 3. The tarp unrolls in a counterclockwise direction, the urging of the springs upon the ropes 28 and 29 does not act to unroll the tarp, but acts to urge the tarp in a straight line from right to left, thereby placing tension on the tarp and acts to keep the tarp straight.

The individual spring for each end of the rod 22 also acts to absorb differences in the ropes 28 and 29 in winding onto the spools, as the one rope may wind unevenly with the other rope which would otherwise cause one end of the rod to pull ahead of the other end of the rod. The individual springs tend to absorb or compensate for the unevenness in the winding so that the tarp will still unroll relatively straight.

The tarp cover device will normally be mounted so that the rod 22, is parallel to the length of the box, so that to unroll the tarp requires less distance.

Thus it will be seen that a novel truck box cover device has been provided which can easily and rapidly be operated to cover the top of the truck box.

The front curved edge 36 of the box 21 may have a metal edge cover 39 which has a relatively straight back 40 and a curved top plate 41 fixed thereto. The edge cover 39 is pivotally mounted to the edge 36 of the box by a parallel linkage 41' and 42' and is pivoted upward to its position shown in FIG. 2 when the tarp is being rolled or unrolled over the top of the box, and is pivoted downward over the edge of the tarp when the tarp has been unrolled to close the top of the box.

The edge cover is used to cover the front edge of the truck box when that edge is mounted behind the cab and the edge cover keeps the wind from traveling between the tarp and the curved top of the box.

A pair of slightly raised ribs 41" may be placed along the flanges 38 and 38' which edges act to seal the tarp by the tarp draping over the ribs.

Figure 5:
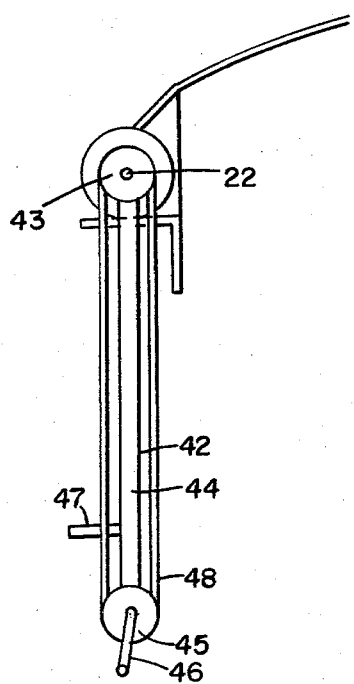
FIG. 5 is a fragmentary end view of the truck box cover with a pulley attachment to the tarp shaft enabling the tarp to be wound and unwound from near the bottom of the box of the truck.
Figure 6:
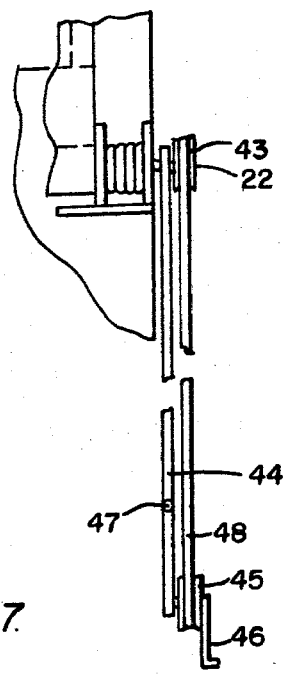
FIG. 6 is a fragmentary side view of the pulley attachment.

In FIGS. 5 and 6 a pulley attachment 42 is illustrated. The pulley attachment 42 has a pulley 43 which is fixed to the outer end of the tarp shaft 22 of the tarp cover and the handle 35 is removed. A metal elongated plate 44 has its upper end pivotally mounted on the shaft 22 and extends downward. A pulley 45 is rotatably mounted to the lower end of the plate 44 and a handle 46 is fixed to the pulley 45. A second handle 47 is fixed to the plate 44. A pulley belt 48 extends around the upper pulley 43.

The plate 44 and belt 48 extend down far enough so that an operator standing on the ground at the rear end of the truck box (FIG. 5) can grasp the handle 47 with one hand and grasp the handle 46 with the other hand and rotate the handle 46 counterclockwise to wind the tarp back up from right to left to open the top of the truck, with the operator walking along the rear end of the truck box from left to right and the top is being wound up. The rotation of the handle 46 counterclockwise will rotate the pulley 45. The rotation of pulley 45 drives the belt 48 counterclockwise and the driving of the belt counterclockwise rotates the pulley 43 on the shaft 22 which rotates the shaft 22 having the tarp thereon, thereby causing the tarp to be wound up on the shaft.

When it is desired to cover the truck box by unwinding the tarp, the pulley attachment will have been moved from the winding of the tarp to the right side of the rear end of the box so the operator will simply grasp the handles 46 and 47 in the same manner and rotate the handle 46 clockwise this time to unwind the tarp while the operator is walking along the end of the box from right to left.

Figure 7:
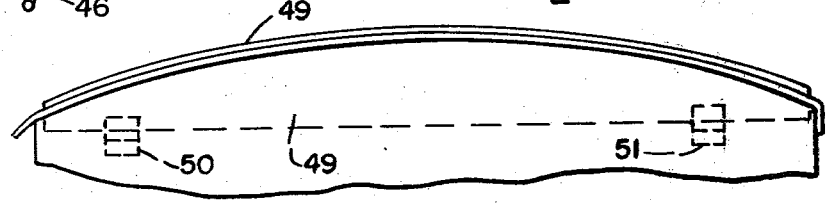
FIG. 7 is a fragmentary end view of the truck box illustrating a modified pivotal mounted edge cover.
Figure 8:
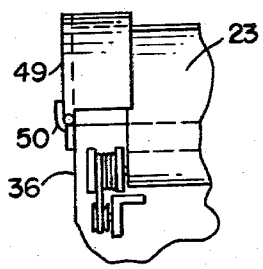
FIG. 8 is a fragmentary side view of the truck box illustrating the modified pivotally mounted edge cover.
Figure 9:
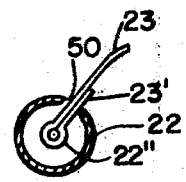
FIG. 9 is a cutaway view of the shaft.

In FIGS. 7 and 8 a modified curved edge 49 similar to curved edge member 39 is illustrated. The curved edge member 49 is the same as the curved edge member 39, except that, the member 49 is pivotally mounted to edge 36 of the truck box by a pair of hinges 50 and 51. Curved edge member 49 may be pivoted from its closed position over the top, as illustrated in solid lines in FIG. 9, counterclockwise to move the curved edge member away so that the tarp may be wound or unwound.

It will be obvious that various changes and departures may be made to the invention without departing from the spirit thereof and accordingly it is not intended that the invention be limited to that specifically described in the specification or as illustrated in the drawing but only as set forth in the appended claims wherein:

What is claimed is:

1. A truck box cover device for attachment to the top of a truck box having side walls and end walls, said device comprising an elongated movable rod positioned adjacent one end of said box and extending across the truck box from above one side wall to a position above the other side wall, a rectangular tarp having one edge attached to said rod and its side edges extending over the side walls with said other end of said tarp fixed to the other end of said box to thereby cover said box, a pulley cable winding means mounted on the ends of said rod for winding and unwinding the cable thereon and movable with said rod means, cable guide means on each side of said box adjacent the one end of said box, a cable on each respective side of said box attached to said cable pulley winding means at their one end and extending from said cable winding means toward and around said cable guide means and fixed at their other ends to said box, each of said cables having spring tension means to provide tension on said cable tending to draw said cable winding pulley means on said rod, and said tarp on said rod toward said one end of said box, means on said rod to rotate said rod, said rotation of said rod in one direction causes said rod and said portion of said tarp on said rod to move by rolling on the top of said box toward said other end of said box and to roll said tarp onto said rod by winding the tarp extending towards the other end of the box onto the rod from beneath the rod, thereby opening the top of the box, the cable winding means moving with the rod and unwinding cable extending to the one end of the box from beneath the rod with the spring tension on the cables acting to keep the tarp taut, and whereby rotating the rod in the opposite direction causes said rod and said portion of said tarp to move by rolling on the top of the box toward the one end of the box, unrolling said tarp from said rod by unwinding said tarp extending towards the other end of the box from beneath the rod, the cable winding means moving with the rod and winding the cable extending to the one end of the box from beneath the rod with the spring action on the cables acting to keep the tarp taut.

* * * * *